United States Patent
Kreuter

(10) Patent No.: US 7,513,433 B2
(45) Date of Patent: Apr. 7, 2009

(54) SECURITY FEATURE

(76) Inventor: Rüdiger G. Kreuter, Heinrich-Delp-Str. 290, Darmstadt (DE) 64297

( * ) Notice: Subject to any disclaimer, the term of this patent is extended or adjusted under 35 U.S.C. 154(b) by 865 days.

(21) Appl. No.: 10/415,199

(22) PCT Filed: Oct. 24, 2001

(86) PCT No.: PCT/EP01/12308

§ 371 (c)(1),
(2), (4) Date: Jan. 14, 2004

(87) PCT Pub. No.: WO02/34547

PCT Pub. Date: May 2, 2002

(65) Prior Publication Data

US 2005/0116463 A1  Jun. 2, 2005

(30) Foreign Application Priority Data

Oct. 24, 2000 (DE) ............................. 100 52 694

(51) Int. Cl.
*G06K 19/06* (2006.01)
*G06K 5/00* (2006.01)
*G03C 11/00* (2006.01)
*G03C 5/00* (2006.01)

(52) U.S. Cl. .................. 235/491; 235/380; 430/21; 430/334; 430/346

(58) Field of Classification Search ............... 235/380, 235/492, 487; 430/334
See application file for complete search history.

(56) References Cited

U.S. PATENT DOCUMENTS

| | | | |
|---|---|---|---|
| 4,523,777 A | 6/1985 | Holbein et al. | |
| 4,766,026 A | 8/1988 | Lass et al. | |
| 4,847,184 A | 7/1989 | Taniguchi et al. | |
| 5,733,693 A * | 3/1998 | Nohr et al. ................... | 430/21 |
| 6,060,223 A * | 5/2000 | Nohr et al. ................... | 430/334 |
| 6,722,700 B1 * | 4/2004 | Christen ...................... | 283/107 |

FOREIGN PATENT DOCUMENTS

| | | |
|---|---|---|
| DE | 30 48 733 | 7/1982 |
| DE | 36 34 857 | 4/1987 |
| EP | 0 230 497 | 8/1987 |
| EP | 0 327 508 | 8/1989 |
| GB | 2 242 161 | 9/1991 |
| GB | 2242161 A * | 9/1991 |
| JP | 08/187939 | 7/1996 |
| WO | 01/28778 | 4/2001 |

* cited by examiner

Primary Examiner—Edwyn Labaze
Assistant Examiner—Thien T Mai
(74) Attorney, Agent, or Firm—Hamre, Schumann, Mueller & Larson, P.C.

(57) ABSTRACT

The invention concerns a process for producing a security feature and a print medium which is equipped in that respect, which affords the possibility of not having to implement any change and in particular mechanical change in the surface of the card body. In that respect the substrate includes at least one change-over substance which by irradiation with light of a given wavelength experiences an irreversible change in color from a starting color to a final color, wherein the substrate in the initial condition is so irradiated with a controlled light beam of that wavelength, in particular a laser light beam that, due to the change in color caused thereby in the change-over substance, an image which can be recognized with the naked eye is produced within the volume of the substrate.

9 Claims, 1 Drawing Sheet

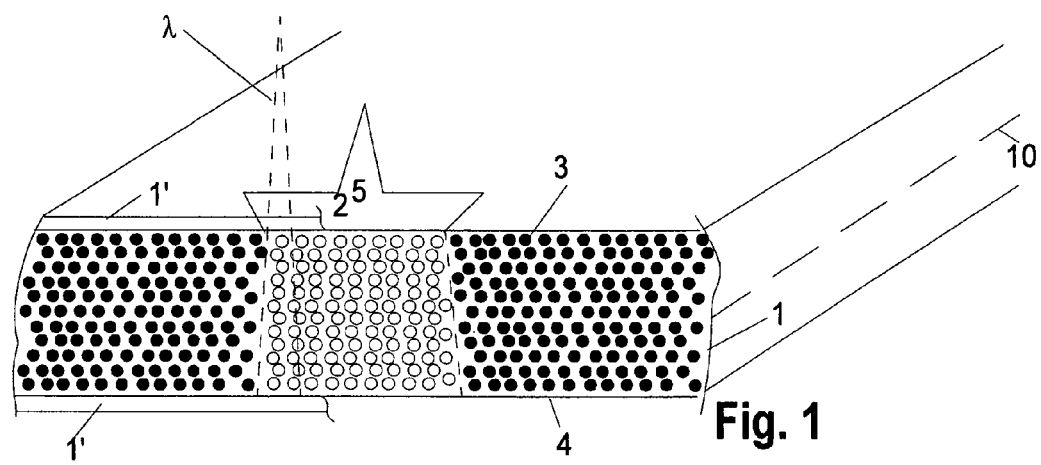
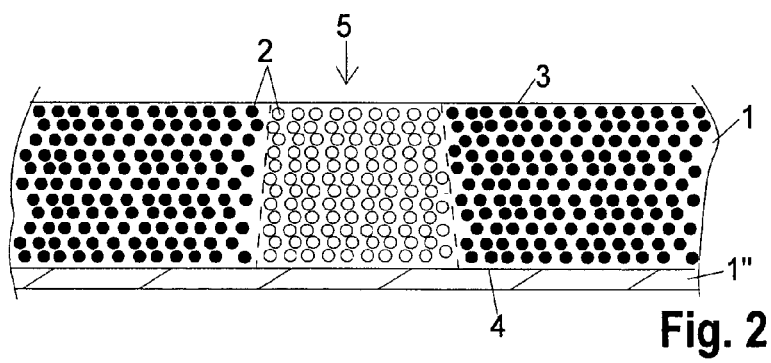
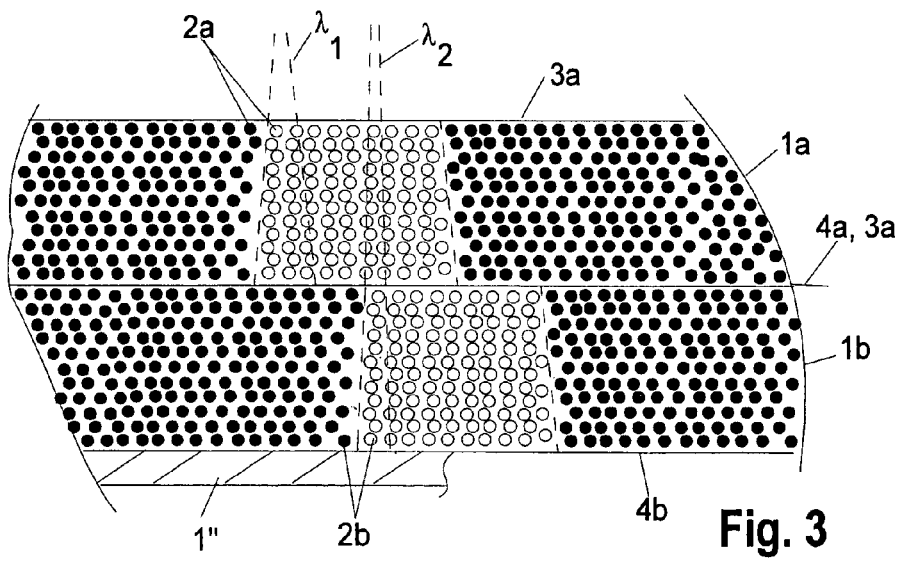

SECURITY FEATURE

FIELD OF THE INVENTION

The invention concerns a process for producing a security feature and a print medium which is equipped in this respect.

BACKGROUND OF THE INVENTION

In order to improve the anti-forgery security features of passes, identity cards, plastic payment cards or credit cards used for payments, various security features will be formed on appropriate print mediums.

For example, one possibility consists in having the plastic payment card made with a multilayer part whose medium layer is opaque, and is used for printing the specific data, whereupon at least the front print side, mostly the rear side too, is coated in a transparent cover layer.

On the upper side of the opaque medium layer there is printed an image, a symbol or something alike, and in the area of the above arranged transparent cover layer there is printed a surface three-dimensional structure having such a configuration that—by deflection and the lens effect of the elements that structure is consisting of—on viewing it from two different direction, usually forming a right angle between them, the different images and symbols respectively of that colours configuration become visible.

Since on the one hand, from a technical point of view, such security features may be forged only by using an expensive equipment, and on the other hand as far as the type of the created image and the symbol respectively are concerned, and in regard of the serial number, the date of fabrication, a.s.o these may be modified, that provides first of all a relatively enhanced protection against short forgeries.

However, the drawback of this security feature consists in having at least some parts of the arrangement on the card body surface which may be smeared, deteriorated or otherwise brought into a non-operating situation.

SUMMARY OF THE INVENTION a) Technical Object

Therefore, the object of this invention is to provide another security feature and a process for producing it, and in particular a security feature which is not implying the necessity of operating modification, in particular mechanical ones, on the surface of the card's body.

b) Attainment of the Object

In this case the basic idea consists in arranging at least a substance in a substrate of the plastic card body or in a layer of that card body which may be made of plastic, paper or a composite material, substance which experiences an irreversible colour change upon being irradiated with a light having a given wavelength, for example a laser beam.

Such a changeover substance may be arranged in a substrate layer uniformly distributed in the form of microcapsules or granules or powder.

Thereby there is possible to produce in the card a visible colour change for the viewer by irradiating it with a laser beam of a given wavelength the changeover substance reacts to. And as long as this substance is directly arranged in the substrate beneath the visible surface for the viewer, and there is a sufficient amount of it, for the viewer there is not visible the changing of the component colour particles but the colour effect of the substrate itself wherein the area irradiated with light of a given wavelength experiences a changing for the viewer. Thereby there is possible to produce images of a different colour inside a previously monochromatic substrate by irradiating it with light, in particular by means of a focused beam or by preventing it from being irradiated by means of an appropriately shaped shutter.

Such an optical effect on a print medium may be indeed theoretically provided by printing on the medium surface too, but however there is another optical effect since on a closer examination there may be noticed that in case of employing a process according to the present invention the optical effect emerges inside the substrate and not on its surface.

Even this optical effect may disappear if the change in colour experienced by the changeover substance which will thereby be produced in the entire substrate, is a change in colour from opaque to transparent.

Thereby a previously entirely coloured card body may become completely transparent upon being irradiated with a given wavelength if the distribution and the density of the changeover substance are sufficiently high and homogeneous.

Thereby the viewer may undertake the examinations relying on the fact that inside the card body there should be a pre-arranged image or a visible symbol which may be best noticed if is viewed in front of a source of light.

In spite of this effect, the rear side of this substrate as seen in regard of the viewer may be coated in an opaque layer, preferably having another colour than the substrate in its previous state, thereby providing a different colouring in the irradiated area, which however becomes visible only in the rear side of the card body, therefore inside it.

Likewise, such a substrate may be coated on the front and/or the rear side with a transparent, durable cover layer.

The advantage of all these features consists in that, on the one hand the surface is always smooth and therefore it should not be mechanically printed or otherwise mechanically influenced, making thus the smearing almost impossible, and on the other hand the employing of this process allows the making of the transparent or otherwise coloured areas, therefore images and symbols, both in different shapes and locations on the initial card. Further on, the image effects thus created, in particular in the shape of transparent areas, may be anytime later improved too by irradiating them with a light of a given wavelength. Thereby the passports may be properly endowed with supplementary security features or the existing security feature may be improved by means of adding supplementary images a.s.o.

Another advantage consists in that the print medium has several overlapping substrate layers, whereupon there is in every substrate layer another changeover substance which therefore reacts to another wavelength.

Thereby, upon being simultaneously irradiated with different wavelength or with time delayed lights having both the given wavelengths, there may be created separate images in each of the overlapping layers, in particular transparent areas. When there are created partially overlapping transparent areas and the initial colour of those two substrate layers is different, there appears a special image effect because, the card body is transparent in the overlapping area of those two substrate layers, which do not overlap as seen from the front and rear side and provide thus another colour in every case and—according to the volume of the irradiated area—another image contour too.

Likewise, there is possible to arrange more different changeover substances which react to different wavelengths in one and the same substrate layer.

BRIEF DESCRIPTION OF THE DRAWINGS

Embodiment in accordance with the invention are described in greater detail by way of example hereinafter with reference to the figures in which FIG. 1 is a partially cross-section representation of a card body, FIG. 2 is a cross-section representation of another card body, and FIG. 3 is a cross-section representation of a card body having more active layers.

DETAILED DESCRIPTION

On the right side of the image there is represented in FIG. 1 a card body having a single layer as it is seen in perspective and in a cross-section through the changeover area 5 in regard of the plane 10 of the card.

The card body consists of one piece of a substrate layer 1, as it may for example be produced by means of a continuous casting or a mould casting, in that substrate layer 1 being uniformly distributed microcapsules or granules 2 comprising a change-over substance which produces an irreversible change of colour when irradiated with a light of a given wavelength λ.

The granules 2 are arranged here in such a dense distribution that the change of colour from the change-over area 5, which is irradiated with that light of a given wavelength λ. will be seen by the viewer as a change of colour of the whole substrate layer 1, namely not only at the surface of this substrate layer 1 but deep inside it.

This means in particular that—as it is presented in FIG. 1—as long as the change of colour takes place from opaque to transparent the change-over area 5 becomes totally transparent for the viewer when irradiated with that light of a given wavelength λ. while the areas of substrate layer 1 outside the change-over area remain in a colour corresponding to the initial colour of the granules 2.

The changeover area may comprise an image, a symbol representation or a letter/numerical code.

As it is represented in the half left side of FIG. 1, the front side 3 and/or the rear side 4 of this substrate layer 1 may be covered in a transparent cover layer 1' which does not comprise any substance to react to that light of a given wavelength λ. and which may be entirely penetrated by it, thus that these cover layers may be applied before irradiation too.

Thereby the already made card may be subjected to a later manipulation by means of a light irradiation, in particular a laser beam having a given wavelength λ. which produces an alteration in the change-over substance.

In FIG. 2 there is represented in its turn another structure of the card body, since on the rear side 4 of the substrate layer 1 comprising granules 2 made of a change-over substance is arranged an opaque cover layer 1". This cover layer 1" preferably has another colour than the initial colour of the substrate layer 1. Thereby after the irradiation with that light of a given wavelength λ. there appears in the change-over area 5 another colour in regard of the remaining area, and consequently for the viewer there appears a bicoloured image whereupon is obviously that the colour effect in the change-over area 5 appears inside the card body, more precisely on the contact surface between the substrate layer 1 and the cover layer 1".

In FIG. 3 there is represented a card body having two substrate layers 1a, 1b, both of them comprising the granules 2a, 2b which consist of different change-over substances, thereby reacting to different wavelengths λ1 and λ2 respectively by irreversibly changing their colour, in particular from opaque to transparent.

These two layers made of card body may—as it is represented in the right side of the image—not be endowed with cover layers.

On irradiating or respectively imprinting with a laser beam having different wavelengths λ1 and λ2 respectively, there may be produced—simultaneously and/or consecutively—change-over areas, therefore differently shaped images.

First of all, if these change-over areas from the layers are partially overlapping—as it may be seen in FIG. 3—this has a gaudy effect for the viewer if the change of colour from these areas always takes place from the initial colour to transparency since there may be altogether created three images by means of these two different irradiated areas.

In the overlapping area of those two changeover areas the card body is completely transparent, therefore representing a first transparent image.

In the area in which the substrate layer 1b having the initial colour is arranged beneath the transparent change-over area of the substrate layer 1a (on the left overlapping area in FIG. 3), the viewer sees an image having the initial colour of the substrate layer 1b if this is looking at the card from the front side 3a of the upper substrate layer 1a.

If the user is inverting the card from the rear side 4a of the other substrate layer 1b he may see a third image which—as it may be seen on the left of the overlapping area in FIG. 3—is having the initial colour of the substrate layer 1a while the adjoining area has the initial colour of the substrate layer 1b.

Of course, this objective may be attained with more than two changeover substance comprising substrate layers 1a, 1b.

On the left half side of the image there is further on represented the possibility of supplementary endowing the rear side 4b with an opaque cover layer 1". However, the above presented tricoloured effect is thus reduced to the bicoloured effect which may be seen from the front side 3a, the overlapping area being thereby opaque as the cover layer 1".

LIST OF REFERENCES

1.—substrate layer
1'—opaque cover layer
1"—transparent cover layer
2.—granules
3.—front side
4.—rear side
5.—change-over area
λ.—wavelength

The invention claimed is:

1. A process for producing an anti-forgery security feature in a plastic personal identification card or a passport, comprising:

providing a multi-layer plastic personal identification card or passport substrate having a first substrate layer and a second substrate layer, the first substrate layer having a first change-over substance dispersed therein, the first change-over substance is permanently changed from opaque to transparent upon irradiation with light of a first wavelength, the second substrate layer having a second change-over substance dispersed therein, the second change-over substance is permanently changed from opaque to transparent upon irradiation with light of a second wavelength;

irradiating the first substrate layer with light of the first wavelength to form at least a first transparent anti-forgery security feature in the first substrate layer, the first transparent anti-forgery security feature extending from a top surface of the first substrate layer to a bottom surface thereof; and irradiating the second substrate layer with light of the second wavelength to form at least a second transparent anti-forgery security feature in the second substrate layer, the second transparent anti-forgery security feature extending from a top surface of the second substrate layer to a bottom surface thereof, with the first transparent anti-forgery security feature in the first substrate layer being offset from and overlapping the second transparent anti-forgery security feature in the second substrate layer wherein there is a first portion of the substrate where the first transparent anti-forgery security feature and the second transparent anti-forgery security feature overlap that is transparent from the top surface of the first substrate layer to the bottom surface of the second substrate layer, a second portion of the substrate where the first transparent anti-forgery security feature overlaps an area of the second substrate layer that is not transparent, and a third portion of the substrate where the second transparent anti-forgery security feature overlaps an area of the first substrate layer that is not transparent; wherein the first and second anti-forgery security features each comprises at least one of an image, a symbol representation or a letter/numerical code.

2. The process of claim 1, wherein irradiating the second substrate layer comprises directing the light with the second wavelength through the first substrate layer.

3. The process of claim 1, wherein irradiating the first substrate layer and irradiating the second substrate layer occur simultaneously.

4. The process of claim 1, wherein irradiating the first substrate layer and irradiating the second substrate layer occur at different times.

5. The process of claim 1, wherein irradiating the first substrate layer and irradiating the second substrate layer occur using a laser beam.

6. The process of claim 1, wherein the first and second transparent anti-forgery security features comprise images in the first substrate layer and in the second substrate layer.

7. A plastic personal identification card or a passport, comprising:

a multi-layer plastic personal identification card or passport substrate having a first substrate layer and a second substrate layer;

the first substrate layer having a first change-over substance dispersed therein that is permanently changed from opaque to transparent, and a first transparent anti-forgery security feature in the first substrate layer resulting from irradiating the first change-over substance of the first substrate layer with light of a first wavelength; and the second substrate layer having a second change-over substance dispersed therein that is permanently changed from opaque to transparent, and a second transparent anti-forgery security feature in the second substrate layer resulting from irradiating the second change-over substance of the second substrate layer with light of a second wavelength, and the first transparent anti-forgery security feature in the first substrate layer is offset from and overlaps the second transparent anti-forgery security feature in the second substrate layer wherein there is a first portion of the substrate where the first transparent anti-forgery security feature and the second transparent anti-forgery security feature overlap that is transparent from a top surface of the first substrate layer to a bottom surface of the second substrate layer, a second portion of the substrate where the first transparent anti-forgery security facture overlaps an area of the second substrate layer that is not transparent, and a third portion of the substrate where the second transparent anti-forgery security feature overlaps an area of the first substrate layer that is not transparent; wherein the first and second anti-forgery security features each comprises at least one of an image, a symbol representation or a letter/numerical code.

8. The plastic personal identification card or passport of claim 7, wherein the first substrate layer and the second substrate layer comprise a plastic material.

9. The plastic personal identification card or passport of claim 7, wherein the first transparent anti-forgery security feature in the first substrate layer and the second transparent anti-forgery security feature in the second substrate layer comprise images.

* * * * *